United States Patent
Shimotani et al.

(10) Patent No.: US 8,677,287 B2
(45) Date of Patent: Mar. 18, 2014

(54) DISPLAY INPUT DEVICE AND NAVIGATION DEVICE

(75) Inventors: Mitsuo Shimotani, Tokyo (JP); Tsutomu Matsubara, Tokyo (JP); Takashi Sadahiro, Tokyo (JP); Masako Ohta, Tokyo (JP); Yuichi Okano, Tokyo (JP); Tsuyoshi Sempuku, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 3 days.

(21) Appl. No.: 13/132,352

(22) PCT Filed: Dec. 2, 2009

(86) PCT No.: PCT/JP2009/006540
§ 371 (c)(1),
(2), (4) Date: Jun. 2, 2011

(87) PCT Pub. No.: WO2010/064423
PCT Pub. Date: Jun. 10, 2010

(65) Prior Publication Data
US 2011/0234639 A1     Sep. 29, 2011

(30) Foreign Application Priority Data
Dec. 4, 2008   (JP) .................................. 2008-309780

(51) Int. Cl.
*G06F 3/048*     (2013.01)
(52) U.S. Cl.
USPC .............................. 715/864; 345/660; 345/661
(58) Field of Classification Search
USPC .............................. 715/864; 345/661; 324/687
See application file for complete search history.

(56) References Cited

U.S. PATENT DOCUMENTS

| | | | | |
|---|---|---|---|---|
| 5,627,567 | A * | 5/1997 | Davidson | 345/173 |
| 6,408,087 | B1 * | 6/2002 | Kramer | 382/124 |
| 6,731,120 | B2 * | 5/2004 | Tartagni | 324/662 |
| 7,554,521 | B1 * | 6/2009 | Migos et al. | 345/156 |
| 2002/0097059 | A1 * | 7/2002 | Tartagni et al. | 324/687 |
| 2002/0180464 | A1 * | 12/2002 | Tartagni | 324/687 |
| 2006/0044283 | A1 * | 3/2006 | Eri et al. | 345/173 |
| 2006/0287817 | A1 * | 12/2006 | Nagel | 701/209 |
| 2007/0005233 | A1 * | 1/2007 | Pinkus et al. | 701/200 |

(Continued)

FOREIGN PATENT DOCUMENTS

| | | |
|---|---|---|
| JP | 4-12877 A | 1/1992 |
| JP | 10-171600 A | 6/1998 |

(Continued)

*Primary Examiner* — William Bashore
*Assistant Examiner* — Nathan Shrewsbury
(74) *Attorney, Agent, or Firm* — Birch, Stewart, Kolasch & Birch, LLP

(57) ABSTRACT

A display input device is comprised of a touch panel 1 for carrying out a display of information and an input of information, a vibration detection sensor (proximity sensors 12 or an acceleration sensor 23) for detecting a vibration of an object to be detected which is positioned opposite to the touch panel 1, and a control unit 3 for, when it is determined that a relative vibration between the touch panel and the object to be detected, which is detected by the vibration detection sensor, has an amount equal to or larger than a predetermined amount, carrying out a process of enlarging an image in a display area having a fixed range, which is displayed on the touch panel 1, to display the enlarged image.

8 Claims, 10 Drawing Sheets

(56) References Cited

U.S. PATENT DOCUMENTS

| | | |
|---|---|---|
| 2007/0084643 A1* | 4/2007 | Hill .......................... 178/18.04 |
| 2007/0103445 A1* | 5/2007 | Pinkus et al. ................. 345/173 |
| 2007/0150173 A1* | 6/2007 | Neef et al. .................... 701/200 |
| 2007/0150179 A1* | 6/2007 | Pinkus et al. ................. 701/208 |
| 2008/0024459 A1* | 1/2008 | Poupyrev et al. ............. 345/173 |
| 2008/0055259 A1* | 3/2008 | Plocher ........................ 345/173 |
| 2008/0061800 A1* | 3/2008 | Reynolds et al. ............. 324/678 |
| 2008/0234933 A1* | 9/2008 | Chowdhary et al. .......... 701/213 |
| 2011/0141063 A1* | 6/2011 | Grundmann et al. ......... 345/175 |
| 2011/0153209 A1* | 6/2011 | Geelen .......................... 701/209 |
| 2011/0234638 A1* | 9/2011 | Hill et al. ...................... 345/661 |
| 2011/0254865 A1* | 10/2011 | Yee et al. ...................... 345/661 |
| 2011/0273477 A1* | 11/2011 | Dehmann et al. ............. 345/661 |
| 2011/0289456 A1* | 11/2011 | Reville et al. ................. 715/830 |

FOREIGN PATENT DOCUMENTS

| | | |
|---|---|---|
| JP | 11-306933 A | 11/1999 |
| JP | 2002-108564 A | 4/2002 |
| JP | 2006-31499 A | 2/2006 |
| JP | 2006-520024 A | 8/2006 |
| JP | 2007-190947 A | 8/2007 |
| JP | 2008-265544 A | 11/2008 |
| WO | WO 2004/051392 A2 | 6/2004 |

* cited by examiner (a)

(b)

(When a Finger has been Approached)

FIG.9
(a) No Vibration is Occurring in Finger
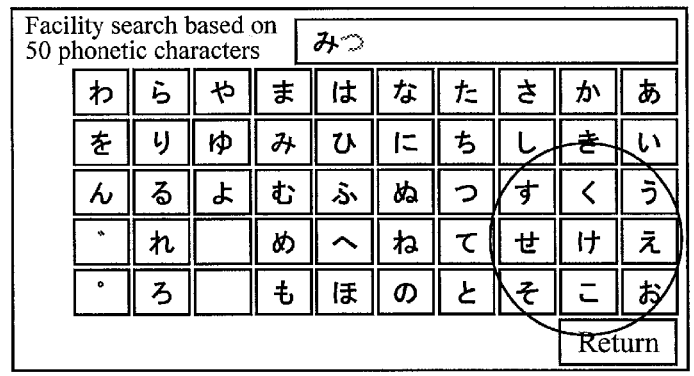
Normal Display
(b) (When Finger has been Approached Vibration is Occurring in Finger and Vehicle is Stopped)
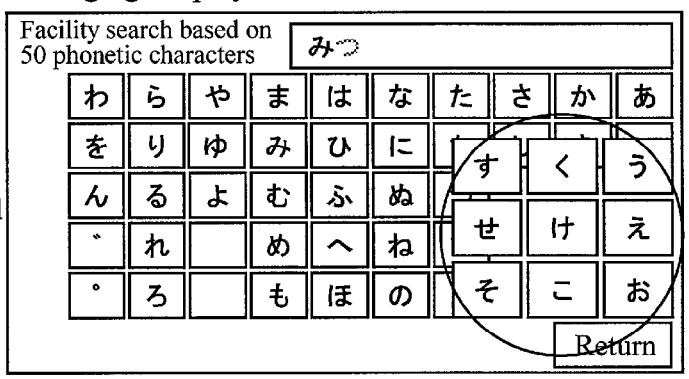
Enlarging Display
(c) (When Finger has been Approached Vibration is Occurring in Finger and Vehicle is Running)
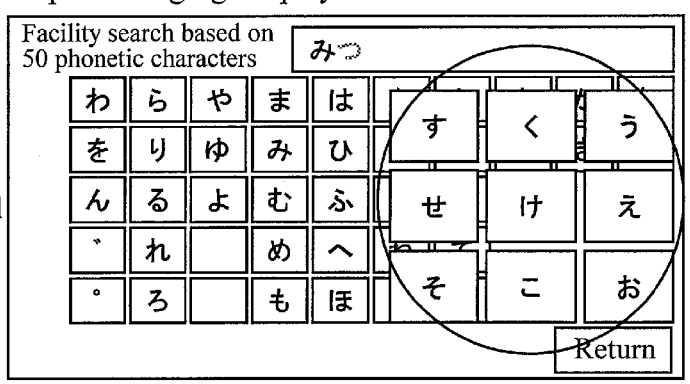
Super-Enlarging Display

DISPLAY INPUT DEVICE AND NAVIGATION DEVICE

FIELD OF THE INVENTION

The present invention relates to a display input device and a navigation device which are particularly suitable for use in vehicle-mounted information equipment such as a navigation system.

BACKGROUND OF THE INVENTION

A touch panel is an electronic part which is a combination of a display unit like a liquid crystal panel, and a coordinate position input unit like a touchpad, and is a display input device that enables a user to touch an image area, such as an icon, displayed on the liquid crystal panel, and detects information about the position of a part of the image area which has been touched by the user to enable the user to operate target equipment. Therefore, in many cases, a touch panel is incorporated into equipment, such a vehicle-mounted navigation system, which has to mainly meet the need for the user to handle the equipment by following a self-explanatory procedure.

Many proposals for improving the ease of use and user-friendliness of a man-machine device including such a touch panel as mentioned above have been applied for patent. For example, a display input device which, when a user brings his or her finger close to the device, enlarges and displays a key switch which is positioned in the vicinity of the finger so as to facilitate the user's selection operation (for example, refer to patent reference 1), a CRT device which detects a vertical distance of a finger and displays information with a scale of enlargement according to the distance (for example, refer to patent reference 2), an input unit which detects a touch pressure to implement an enlarged display when the touch is a light one and implement a predetermined key operation when the touch is a strong one (for example, refer to patent reference 3), and so on have been known.

RELATED ART DOCUMENT

Patent Reference

Patent reference 1: JP, 2006-31499, A
Patent reference 2: JP, 04-12877, A
Patent reference 3: JP, 10-171600, A

SUMMARY OF THE INVENTION

According to the technology disclosed by above-mentioned patent reference 1, because when a user brings his or her finger close to the touch panel, an enlarged display of an icon positioned in the vicinity of the position where the user's finger is close to the touch panel is produced, operation mistakes can be prevented and the user is enabled to easily perform an operation of selecting the icon. However, when a user operates the display input device while standing or in a case in which the display input device is applied to vehicle-mounted information equipment, it is undeniable that the ease of use of the display input device is reduced as the screen vibrates because the user's finger vibrates or the vehicle is running. In contrast with this, there is a case in which an enlarged display of a key switch in a state in which the screen does not vibrate impairs the ease of use of the display input device.

Furthermore, according to the technology disclosed by patent reference 2, if the position of the finger is too far away from the touch panel face when trying to control the scaling, the scaling sways due to a vibration in the Z axial direction of the finger, and therefore the control operation may become difficult. In addition, a problem with the technology disclosed by patent reference 3 is that the scale of enlargement is fixed and therefore any user's intention is not reflected.

The present invention is made in order to solve the above-mentioned problems, and it is therefore an object of the present invention to provide a display input device that makes it easy for a user to perform an input operation even when a vibration is occurring, and that provides excellent ease of use.

In order to solve the above-mentioned problems, a display input device in accordance with the present invention includes: a touch panel for detecting an approach of an object to be detected in a non-contact manner, and for carrying out an input of information and a display of an image; a vibration detection sensor for detecting a vibration of a finger which is positioned opposite to the above-mentioned touch panel; and a control unit for, when it is determined that a relative vibration between the above-mentioned touch panel and the finger, which is detected by the above-mentioned vibration detection sensor, has an amount equal to or larger than a predetermined amount, carries out a process of enlarging an image in a display area having a fixed range, which is displayed on the above-mentioned touch panel, to display the enlarged image.

Therefore, the display input device in accordance with the present invention makes it easy for a user to perform an input operation even when a vibration is occurring, and provides excellent ease of use.

BRIEF DESCRIPTION OF THE FIGURES

FIG. 9 is a screen transition figure schematically showing the operation of a display input device in accordance with Embodiment 3 of the present invention on a touch panel.

EMBODIMENTS OF THE INVENTION

Hereafter, in order to explain this invention in greater detail, the preferred embodiments of the present invention will be described with reference to the accompanying drawings.

Embodiment 1

Figure 1:
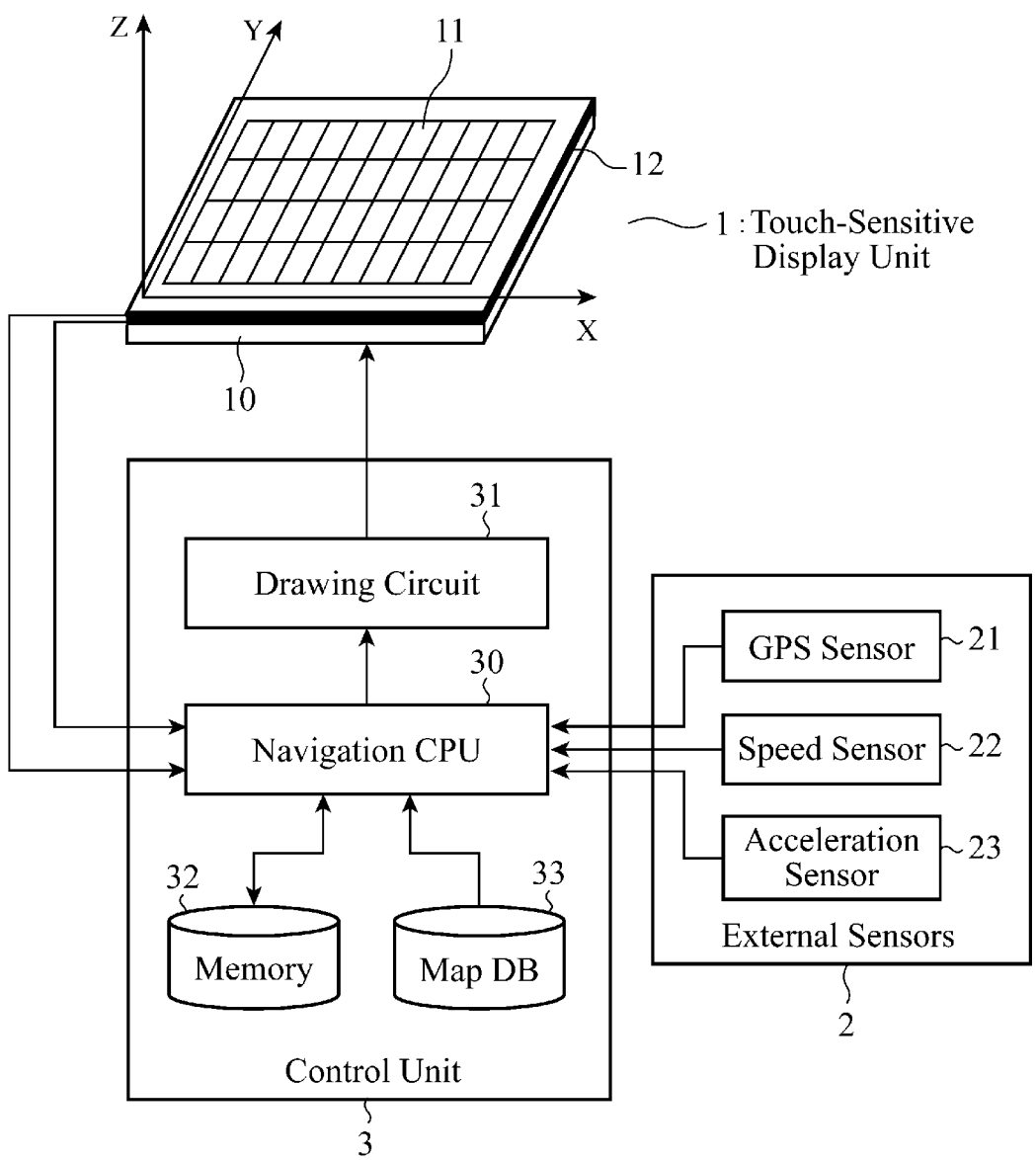
FIG. 1 is a block diagram showing the internal structure of a display input device in accordance with Embodiment 1 of the present invention.

FIG. 1 is a block diagram showing the structure of a display input device in accordance with Embodiment 1 of the present invention. As shown in FIG. 1, the display input device in accordance with Embodiment 1 of the present invention is comprised of a touch-sensitive display unit 1, external sensors 2, and a control unit 3.

The touch-sensitive display unit (abbreviated as the touch panel from here on) 1 carries out a display of information and an input of the information. For example, the touch panel 1 is constructed in such a way that a touch sensor 11 for inputting information is laminated on an LCD panel 10 for displaying information. In this embodiment, the touch panel 1 and a plurality of proximity sensors 12 each of which carries out non-contact detection in two dimensions of a movement of an object to be detected, such as a finger or a pen, which is positioned opposite to the touch panel 1 are mounted on a peripheral portion outside the touch sensor 11 on a per-cell basis.

In a case in which each of the proximity sensors 12 uses an infrared ray, infrared ray emission LEDs (Light Emitted Diodes) and light receiving transistors are arranged, as detection cells, opposite to each other on the peripheral portion outside the touch sensor 11 in the form of an array. Each of the proximity sensors 12 detects a block of light emitted therefrom or reflected light which is caused by an approach of an object to be detected to detect the approach and also detects the coordinate position of the object.

The detection cells of the proximity sensors 12 are not limited to the above-mentioned ones each of which employs an infrared ray. For example, sensors of capacity type each of which detects an approach of an object to be detected from a change of its capacitance which occurs between the object to be detected and two plates arranged in parallel like a capacitor can be alternatively used. In this case, one of the two plates serves as a ground plane oriented toward the object to be detected, and the other plate side serves as a sensor detection plane, and each of the sensors of capacity type can detect an approach of the object to be detected from a change of its capacitance formed between the two plates and can also detect the coordinate position of the object.

On the other hand, the external sensors 2 can be mounted at any positions in a vehicle, and include at least a GPS (Global Positioning System) sensor 21, a speed sensor 22, and an acceleration sensor 23.

The GPS sensor 21 receives radio waves from GPS satellites, creates a signal for enabling the control unit 3 to measure the latitude and longitude of the vehicle, and outputs the signal to the control unit 3. The speed sensor 22 measures vehicle speed pulses for determining whether or not the vehicle is running and outputs the vehicle speed pulses to the control unit 3. The acceleration sensor 23 measures a displacement of a weight attached to a spring to estimate an acceleration applied to the weight, for example. In a case in which the acceleration sensor 23 is a three-axis one, the acceleration sensor follows an acceleration variation ranging from 0 Hz (only the gravitational acceleration) to several 100 Hz, for example, and measures the direction (attitude) of the weight with respect to the ground surface from the sum total of acceleration vectors in X and Y directions and informs the direction to the control unit 3.

The control unit 3 has a function of, when it is determined that a relative vibration between a vibration of a finger, which is positioned opposite to the touch panel 1, acquired by the touch panel 1 and the proximity sensor 12 for detecting the vibration of the finger in a non-contact manner, and a vibration of the touch panel 1 acquired by the external sensors 2 (the acceleration sensor 23) or an acceleration sensor (not shown) built in the touch panel 1 has an amount equal to or larger than a predetermined amount, enlarging an image in a display area having a fixed range which is displayed on the touch panel 1 to display the enlarged image, in addition to fundamental processing functions required to implement navigation functions, such as a route search and destination guidance. In this invention, the proximity sensors 12 and the acceleration sensor 23 are collectively referred to as a "vibration detection sensor".

To this end, the control unit 3 is comprised of a CPU (referred to as a navigation CPU 30 from here on) which mainly carries out navigation processing and controls the touch panel 1, a drawing circuit 31, a memory 32, and a map DB (Data Base) 33.

The navigation CPU 30 carries out a navigation process of, when a navigation menu, such as a route search menu, which is displayed on the touch panel 1 is selected by a user, providing navigation following the menu. When carrying out the navigation process, the navigation CPU 30 refers to map information stored in the map DB 33, and carries out a route search, destination guidance or the like according to various sensor signals acquired from the external sensors 2.

Figure 2:
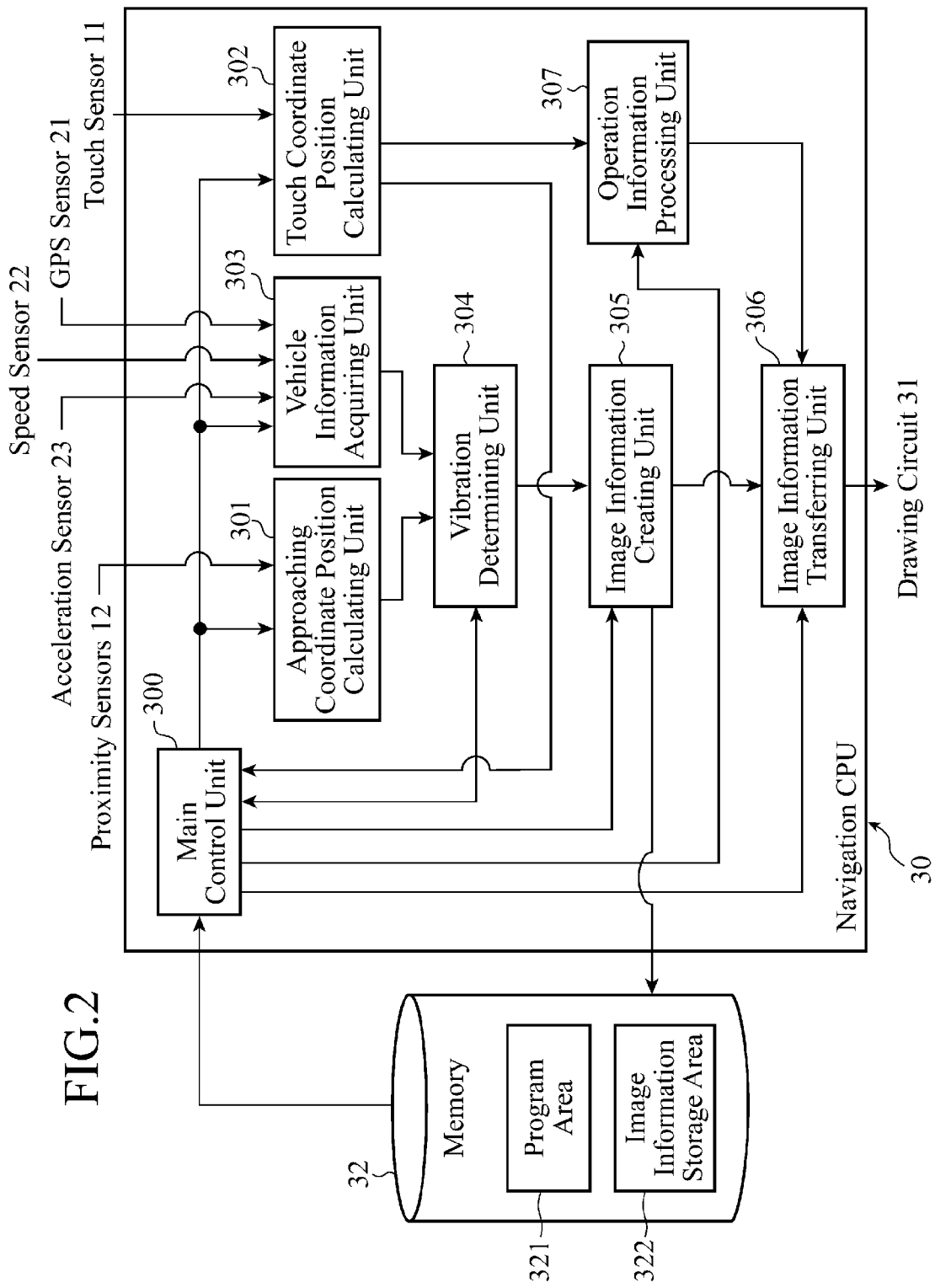
FIG. 2 is a block diagram showing a functional development of the program structure of a navigation CPU which the display input device in accordance with Embodiment 1 of the present invention has.

Furthermore, in order to implement the control unit 3's function of, when it is determined that the vibration between the touch panel 1 and the finger which is detected by the proximity sensors 12 or the acceleration sensor 23 has an amount equal to or larger than the predetermined amount, enlarging an image in a display area having a fixed range which is displayed on the touch panel 1 to display the enlarged image, the navigation CPU 30 creates image information and controls the drawing circuit 31 according to a program stored in the memory 32. The structure of the program which the navigation CPU 30 executes in that case is shown in FIG. 2, and the details of the structure will be mentioned below.

Figure 3:
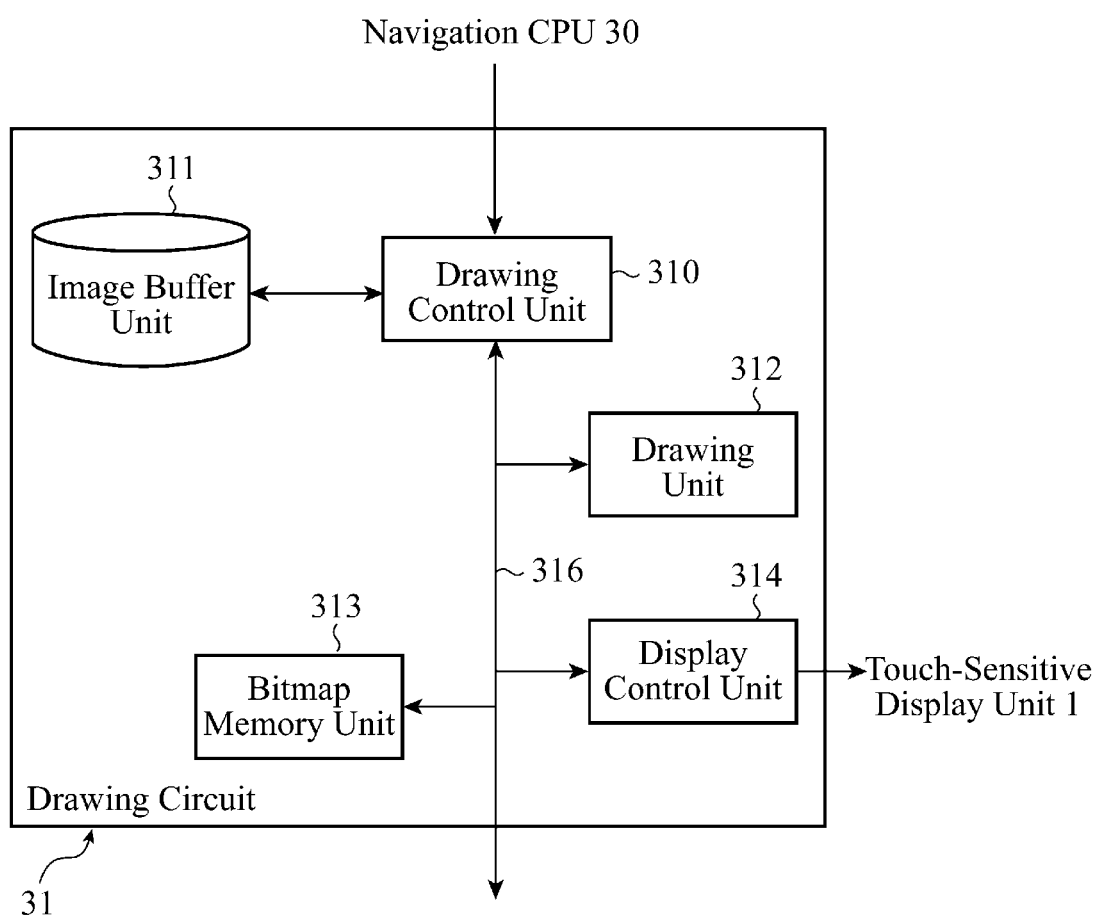
FIG. 3 is a block diagram showing the internal structure of a drawing circuit which the display input device in accordance with Embodiment 1 of the present invention has.

The drawing circuit 31 expands the image information created by the navigation CPU 30 on a bit map memory unit built therein or mounted outside the drawing circuit at a fixed speed, reads image information which is expanded on the bit map memory unit by a display control unit similarly built therein in synchronization with the display timing of the touch panel 1 (the LCD panel 10), and displays the image information on the touch panel 1. The above-mentioned bit map memory unit and the above-mentioned display control unit are shown in FIG. 3, and the details of these components will be mentioned below.

An image information storage area and so on are assigned to a work area of the memory 32, which is provided in addition to a program area in which the above-mentioned program is stored, and image information are stored in the memory 32.

Furthermore, maps, facility information and so on required for navigation including a route search and guidance are stored in the map DB 33.

FIG. 2 is a block diagram showing a functional development of the structure of the program which the navigation CPU 30 of FIG. 1, which the display input device (the control unit 3) in accordance with Embodiment 1 of the present invention has, executes.

As shown in FIG. 2, the navigation CPU 30 includes a main control unit 300, an approaching coordinate position calculating unit 301, a touch coordinate position calculating unit 302, a vehicle information acquiring unit 303, a vibration determining unit 304, an image information creating unit 305, an image information transferring unit 306, and an operation information processing unit 307.

The approaching coordinate position calculating unit 301 has a function of, when the proximity sensors 12 detect an approach of a finger to the touch panel 1, calculating the X, Y coordinate position of the finger and delivering the X, Y coordinate position to the vibration determining unit 304. The X, Y coordinates calculated by the approaching coordinate position detecting unit 301 are outputted continuously at intervals of 0.01 seconds during a time period of 0.1 seconds, for example. When there is little change in the X, Y coordinate value during the time period of 0.1 seconds, the vibration determining unit 304 determines that the finger does not have any vibration, whereas when there is a change of a predetermined amount or more in the X, Y coordinate value, the vibration determining unit determines that the finger has a vibration and controls the image information creating unit 305 via the main control unit 300. For the convenience of this explanation, although it is described that the vibration determining unit determines whether the finger has a vibration during 0.1 seconds, the vibration determining unit can keep a history of some continuously-performed determinations of whether the finger has a vibration during 0.1 seconds and determine whether the finger has a vibration from the several pieces of information each about the determination during a time period of 0.1 seconds, thereby further improving the accuracy of the determination.

The touch coordinate position calculating unit 302 has a function of, when the touch sensor 11 detects a touch of a finger on the touch panel 1, calculating the X, Y coordinate position of the touch and delivering the X, Y coordinate position to the main control unit 300.

The vehicle information acquiring unit 303 has a function of acquiring signals outputted by the external sensors 2 (the GPS sensor 21, the speed sensor 22 and the acceleration sensor 23), and delivering the signals to the main control unit 300.

The vibration determining unit 304 can have a function of measuring the amount of relative vibration between the touch panel 1 and the finger from the changing state of the X, Y coordinates of the finger outputted from the approaching coordinate position calculating unit 301 and the acceleration information outputted by the vehicle information acquiring unit 303 under the control of the main control unit 300 to determine whether the relative vibration has an amount equal to or larger than the predetermined amount.

As will be mentioned below, the vibration determining unit 304 can store the vibration status shown by the Y, Y coordinates outputted from the approaching coordinate position calculating unit 301, and the vibration status shown by the change in the acceleration information acquired by the vehicle information acquiring unit 303 in a time series only during a predetermined time period, extracts a predetermined frequency component from the time-series data, and, when an error (a variance) from the calculated average amplitude of the frequency component has a predetermined value or more, determine that the relative vibration has the amount equal to or larger than a predetermined amount and then control the image information creating unit 305 via the main control unit 300.

The image information creating unit 305 has a function of creating image information to be displayed on the touch panel 1 (the LCD panel 10) under the control of the main control unit 300, and outputting the image information to the image information transferring unit 306.

In order to carry out the process of enlarging an image in a display area having a fixed range which is displayed on the touch panel 1 to display the enlarged image, the image information creating unit 305 reads an already-created bitmap image, such as an icon, while skipping at fixed intervals of some pixels, and interpolates intermediate pixels to draw an image into a new bitmap, for example. For example, the image information creating unit 305 can implement the enlarging process by copying the value of each pixel of the original bitmap image to each of the four values of an array of two rows and two columns and then transferring the updated image to the drawing circuit 31 when enlarging the already-created bitmap image to twice of its original size. In contrast with this, when reducing the original bitmap image, the image information creating unit can implement this reducing process by thinning out the pixels of the original bitmap image while skipping at fixed intervals of some pixels to update the bitmap image and then transferring the updated image to the drawing circuit 31. Although the method of enlarging or reducing the original bitmap image is explained as an example, in a case of processing a vector image instead of a bit image, the vector image can be enlarged or reduced to a more beautiful image through a predetermined enlarging and reducing computation.

The image information transferring unit 306 has a function of transferring the image information created by the image information creating unit 305 to the drawing circuit 31 under the timing control of the main control unit 300.

The operation information processing unit 306 has a function of creating operation information defined for an icon which is based on the coordinate position of the touch calculated by the touch coordinate position calculating unit 302, outputting the operation information to the image information transferring unit 304, and then displaying the operation information on the touch panel 1 (the LCD monitor 10) under the control of the main control unit 300. For example, when the icon is a key of a soft keyboard, the operation information processing unit 306 creates image information based on a touched key, outputs the image information to the image information transferring unit 306, and then displays the image information on the touch panel 1. When the icon is an icon button, the operation information processing unit 306 carries out a navigation process defined for the icon button, such as a destination search, creates image information, outputs the image information to the image information transferring unit 306, and then displays the image information on the touch panel 1.

The work area having a predetermined amount of storage, in addition to the program area 321 in which the above-mentioned program is stored, is assigned to the memory 32. In this work area, the image information storage area 322 in which the image information created by the image information creating unit 305 is stored temporarily is included.

FIG. 3 is a block diagram showing the internal structure of the drawing circuit 31 shown in FIG. 1. As shown in FIG. 3, the drawing circuit 31 is comprised of a drawing control unit 310, an image buffer unit 311, a drawing unit 312, the bitmap memory unit 313, and the display control unit 314. They are commonly connected to one another via a local bus 316 which consists of a plurality of lines used for address, data and control.

In the above-mentioned construction, the image information transferred from the navigation CPU 30 (the image information transferring unit 306) shown in FIG. 2 is held by the image buffer unit 311 under the control of the drawing control unit 310, and the drawing control unit 310 decodes a command such as a straight line drawing command or a rectangle drawing command, or carries out preprocessing about the slope of a line or the like prior to a drawing process. The drawing unit 312, which is started by the drawing control unit 310, then carries out high-speed drawing of the image information decoded by the drawing control unit 310 into the bitmap memory unit 313, and the display control unit 314 reads and displays the image information held by the bitmap memory unit 313 in synchronization with the display timing of the LCD panel 10 of the touch panel 1.

Figure 4:
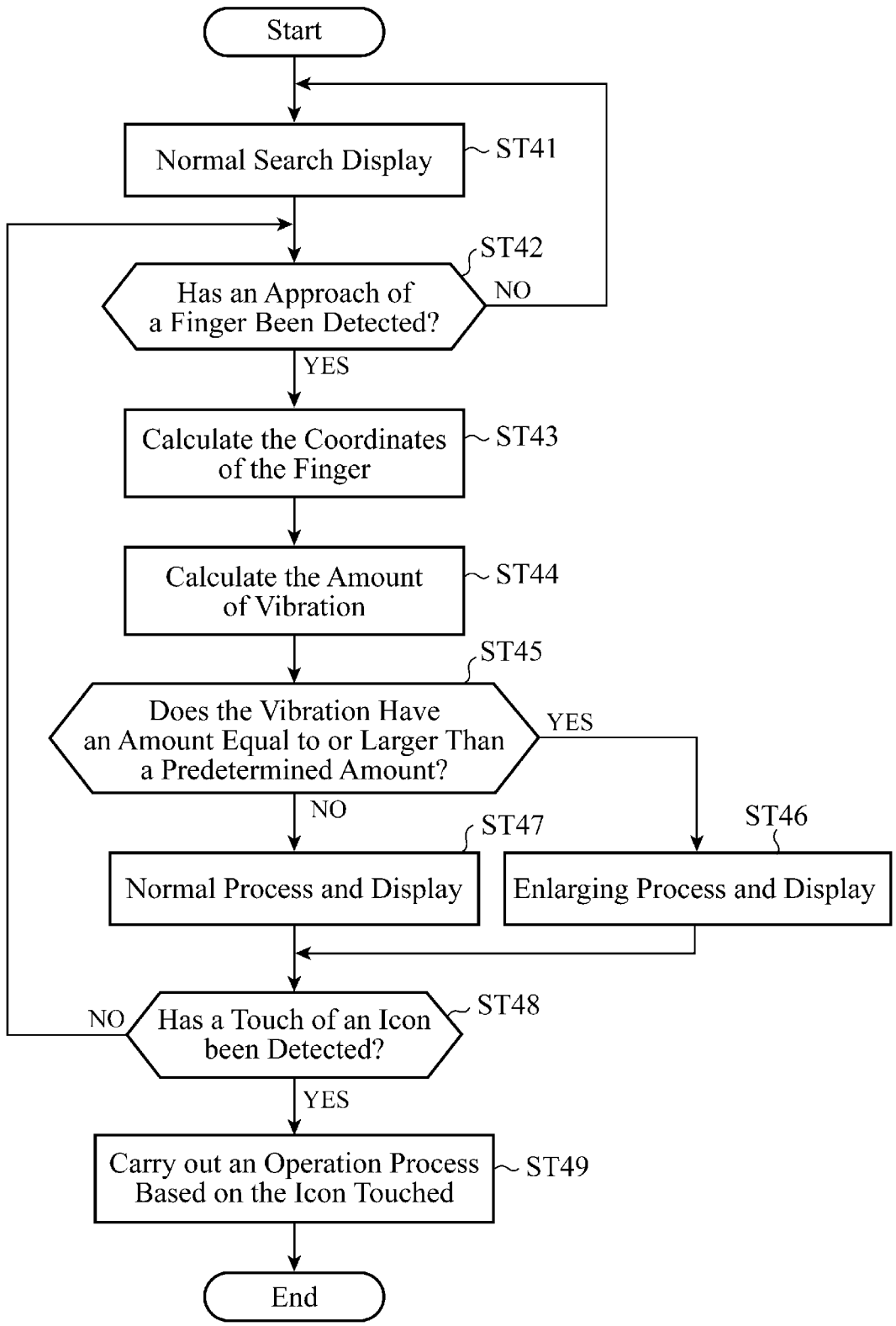
FIG. 4 is a flow chart showing the fundamental operation of the display input device in accordance with Embodiment 1 of the present invention.
Figure 5:
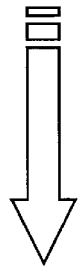
FIG. 5 is a screen transition figure schematically showing the operation of the display input device in accordance with Embodiment 1 of the present invention on a touch panel.

FIG. 4 is a flow chart showing the operation of the display input device in accordance with Embodiment 1 of the present invention, and FIG. 5 is a view showing an example of a soft keyboard image displayed on the touch panel 1 at that time.

Hereafter, the operation of the display input device in accordance with Embodiment 1 of the present invention shown in FIGS. 1 to 3 will be explained in detail with reference to FIGS. 4 and 5.

In FIG. 4, a soft keyboard used at the time of a facility search as shown in FIG. 5(*a*) is displayed on the touch panel 1, for example (step ST41).

In this state, when a user brings his or her finger close to the touch panel 1 first, the proximity sensors 12 detects the approach of the finger (if "YES" in step ST42), and the approaching coordinate position calculating unit 301 of the navigation CPU 30 starts operating, calculates the X (Y) coordinate of the finger and outputs the coordinate calculated thereby to the vibration determining unit 304 (step ST43). For example, the approaching coordinate position calculating unit 301 outputs the coordinate of the finger calculated thereby to the vibration determining unit 304 every 0.01 second only during a time period of 0.1 seconds.

The vibration determining unit 303 can recognize the vibration of the finger and calculate the vibration amount by receiving the coordinate of the finger inputted thereto continuously during the time period of 0.1 seconds (step ST44).

In addition, the acceleration information is furnished to the vibration determining unit 304 from the acceleration sensor 23 via the vehicle information acquiring unit 303. The vibration determining unit can also recognize a vibration of the touch panel 1 on the same principle as that behind the vibration detection using the above-mentioned proximity sensors 12 and calculate the vibration amount from the coordinate values from the approaching coordinate position calculating unit 301 and the acceleration information acquired by the vehicle information acquiring unit 303.

Therefore, when determining that the relative vibration between the touch panel 1 and the finger has an amount equal to or larger than the predetermined amount (if "YES" in step ST45), the vibration determining unit 304 starts the image information creating unit 305 performing the image information creating process under the control of the main control unit 300, and the image information creating unit 305 carries out the process of enlarging an image in a display areas having a fixed range, such as a partial area of the software keyboard, to update the image.

More specifically, in order to carry out the process of enlarging the image in the display area having the fixed range which is displayed on the touch panel 1, the image information creating unit 305 reads the image information in a partial area (in a circle in the figure) of the already-created soft keyboard from the image information storage area 322 of the memory 32 while skipping at fixed intervals of some pixels, and interpolates intermediate pixels to combine this image with image information (no enlargement) about a surrounding image into new image information, and update the soft keyboard image using the new image information, as shown in FIG. 5(*b*), for example.

The updated image information is outputted to the image information transferring unit 306 while the updated image information is stored in the image information storage area 322 of the memory 32. The image information transferring unit 306 receives the updated image information and then transfers this image information to the drawing circuit 31, and the drawing control unit 310 of the drawing circuit 31 expands the image information transferred thereto, and the drawing unit 312 draws the expanded image information into the bitmap memory unit 313 at a high speed. Finally, the display control unit 314 reads the image drawn in the bitmap memory unit 313 to create an enlarged screen display on the touch panel 1 (the LCD panel 10) (step ST46).

In contrast, when the vibration determining unit 304, in step ST45, cannot detect any vibration having the predetermined amount or more (if "NO" in step ST45), the image information creating unit 305 creates a soft keyboard image as shown in FIG. 5(*a*), and outputs the soft keyboard image to the image information transferring unit 306. The image information transferring unit 306 transfers the soft keyboard image to the drawing circuit 31, and, in the drawing circuit 31, the drawing control unit 310 expands the image information transferred to the drawing circuit and the drawing unit 312 draws the expanded image information into the bitmap memory unit 313 at a high speed. The display control unit 314 then creates a normal size screen display on the touch panel 1 (the LCD panel 10) (step ST47).

When the touch panel 1 (the touch sensor 11) detects that the finger has touched an icon (if "YES" in step ST48), the touch coordinate position calculating unit 302 calculates the coordinate position of the touch and then starts the operation information processing unit 307. The operation information processing unit 307 then carries out an operation process based on the key corresponding to the coordinates of the touch calculated by the touch coordinate position calculating unit 302 (step ST49).

In the case in which the touched icon is a key of the soft keyboard, the operation process based on the key corresponding to the coordinates of the touch is the one of creating image information based on the touched key, outputting the image information to the image information transferring unit 306, and then displaying the image information on the touch panel 1 (the LCD monitor 10). In the case in which the touched icon is an icon button, the operation process based on the key corresponding to the coordinates of the touch is the one of carrying out a navigation process defined for the icon button, such as a destination search, creating image information, outputting the image information to the image information transferring unit 306, and then displaying the image information on the touch panel 1 (the LCD monitor 10).

Figure 6:
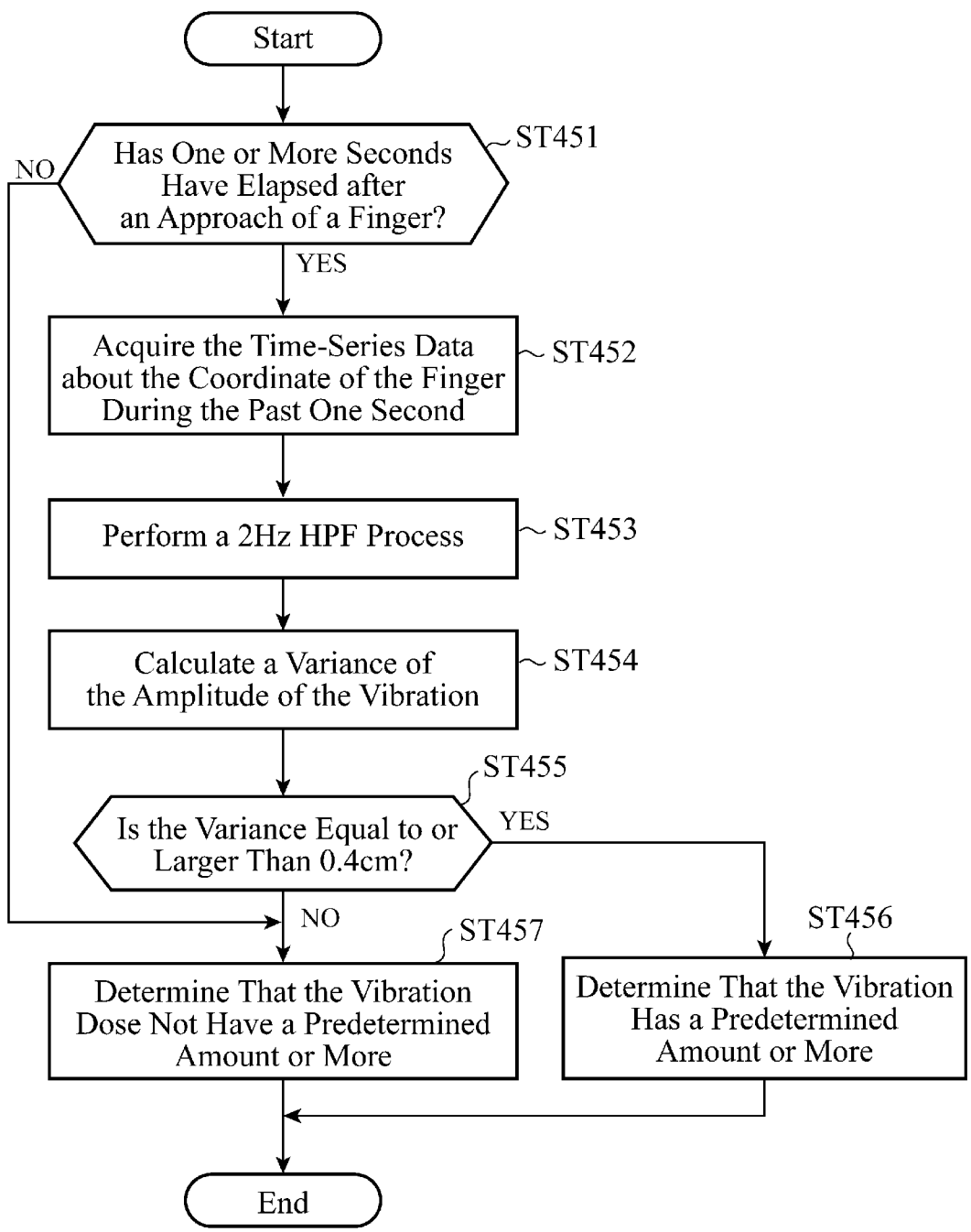
FIG. 6 is a flow chart showing a vibration determining process operation carried out by the display input device in accordance with Embodiment 1 of the present invention.

FIG. 6 is a flow chart showing a concrete operation of the above-mentioned vibration determining unit 304, and corresponding to the detailed processing procedure in steps ST42 to ST45 of the flow chart of FIG. 4.

Hereafter, the concrete operation of the vibration determining unit 304 shown in FIG. 2 will be explained in detail with reference to the flow chart of FIG. 6.

Hereafter, the explanation will be made focusing on the detection of a vibration in the X direction of a finger. The vibration determining unit 304 measures the time which has elapsed after the proximity sensors 12 has detected an approach of a finger first. As a result, when one second or more has elapsed, for example (if "YES" in step ST451), the vibration determining unit 304 acquires the time-series data about the X coordinates which the approaching coordinate position calculating unit 301 has calculated and stored during the past one second (step ST452). The vibration determining unit 304 then performs an HPF (High Pass Filter) process of order of about 2 Hz on the time-series data, for example, so as to remove a relatively-low vibration component from the time-series data (step ST453).

Next, the vibration determining unit 304 calculates an error (a variance) from the average amplitude of the vibration during the past one second (step ST454). When the error is equal to or larger than a threshold (if "YES" in step ST455), the vibration determining unit determines that the relative vibration has an amount equal to or larger than the predetermined amount and controls the image enlarging process carried out by the image information creating unit 305 via the main control unit 300 (step ST456). In contrast, when the error is smaller than the threshold (if "NO" in step ST455), the vibration determining unit determines that the relative vibration between the touch panel and the finger does not have an amount equal to or larger than the predetermined amount (step ST457). For the convenience of the explanation, although the explanation is made by paying attention only to a variation in the direction of the X axis, by detecting vibrations in consideration of both a variation in the direction of the X axis and a variation in the direction of the Y axis, the display input device can also detect a variation in the direction of the Y axis, thereby further improving the accuracy of the detection. For example, variations can be calculated by using a vectorial representation on the X, Y plane.

Figure 7:
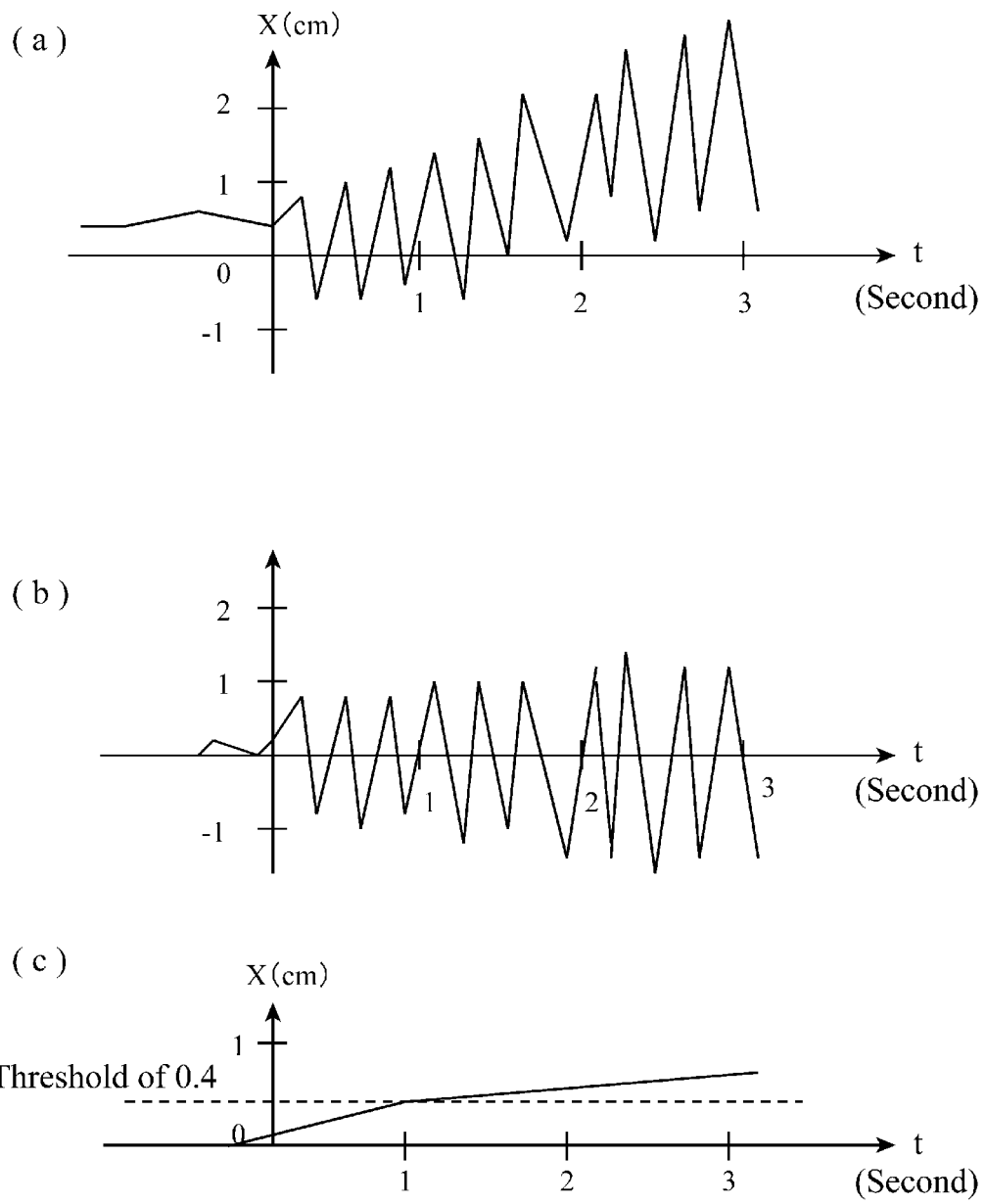
FIG. 7 is a timing chart showing the vibration determining process operation carried out by the display input device in accordance with Embodiment 1 of the present invention.

The concrete operation of the vibration determining unit 304 is shown in a timing chart of FIG. 7. FIG. 7(*a*) shows the time-series data (the vibration status) about the X coordinates stored during three seconds in the time-series data acquiring process of step ST452 of FIG. 6, FIG. 7(*b*) shows the time-series data on which the HPF process of step ST453 has been performed, and FIG. 7(*c*) shows the variance from the average amplitude of the vibration during the past one second, which is outputted in the variance calculating process of step ST454.

The threshold for the variance shown in the FIG. 7(*c*) is set to 0.4 cm, and, when the calculated variance exceeds 0.4 cm, the vibration determining unit 304 determines that the relative vibration has an amount equal to or larger than the predetermined amount and controls the image information creating unit 305 via the main control unit 300.

In the above-mentioned display input device in accordance with Embodiment 1 of the present invention, when it is determined that a relative vibration between the touch panel 1 and a finger approaching the touch panel, which is detected by the vibration detection sensor (the proximity sensors 12 or the acceleration sensor 23) has an amount equal to or larger than the predetermined amount, the control unit 3 (the navigation CPU 30) carries out the enlarging process of enlarging an image in a display area having a fixed range which is displayed on the touch panel 1 to display the enlarged image. Thus, the display input device can provide a new user interface via which an enlarged screen display is created when it is determined that a vibration is occurring in a finger approaching the touch panel. When the display input device is particularly used for vehicle-mounted equipment, because the image in the display area having the fixed range, such as a touched key of a software keyboard or the like, or an icon, which is displayed on the touch panel 1, is enlarged and displayed, the user-friendliness of the equipment is improved without being influenced by a vibration of the touch panel 1 and a vibration of the approaching finger while the vehicle is running, and therefore the ease of use of the equipment can be improved. Although the normal process and display is carried out in step ST47 of FIG. 4, the information displayed can alternatively remain being unchanged. In this case, because after an enlarged screen display is temporarily created in step ST46, the enlarged screen display is maintained even if the vibration of the finger disappears, there is provided an advantage of being able to fix the size of the display to make it easy for the user to see the display. Furthermore, the display input device can be constructed in such a way as to, when a state in which there is no vibration having a predetermined amount or more continues for a fixed period of time in step ST47, carry out the normal process and display without changing the information displayed during the above-mentioned fixed period of time. In this case, there is provided an advantage of, when the vibration disappears after the enlarging process is carried out temporarily, being able to return to the original display slowly after the above-mentioned fixed period of time has elapsed, thereby making it easy for the user to see the display.

The vibration determining unit 304 can calculate the relative vibration between the touch panel 1 and the finger only from the acceleration information acquired from the acceleration sensor 23 via the vehicle information acquiring unit 303.

Furthermore, the vibration determining unit 304 can change the scale of enlargement according to the vibration amount when the control unit carries out the enlarging process.

Embodiment 2

Figure 8:
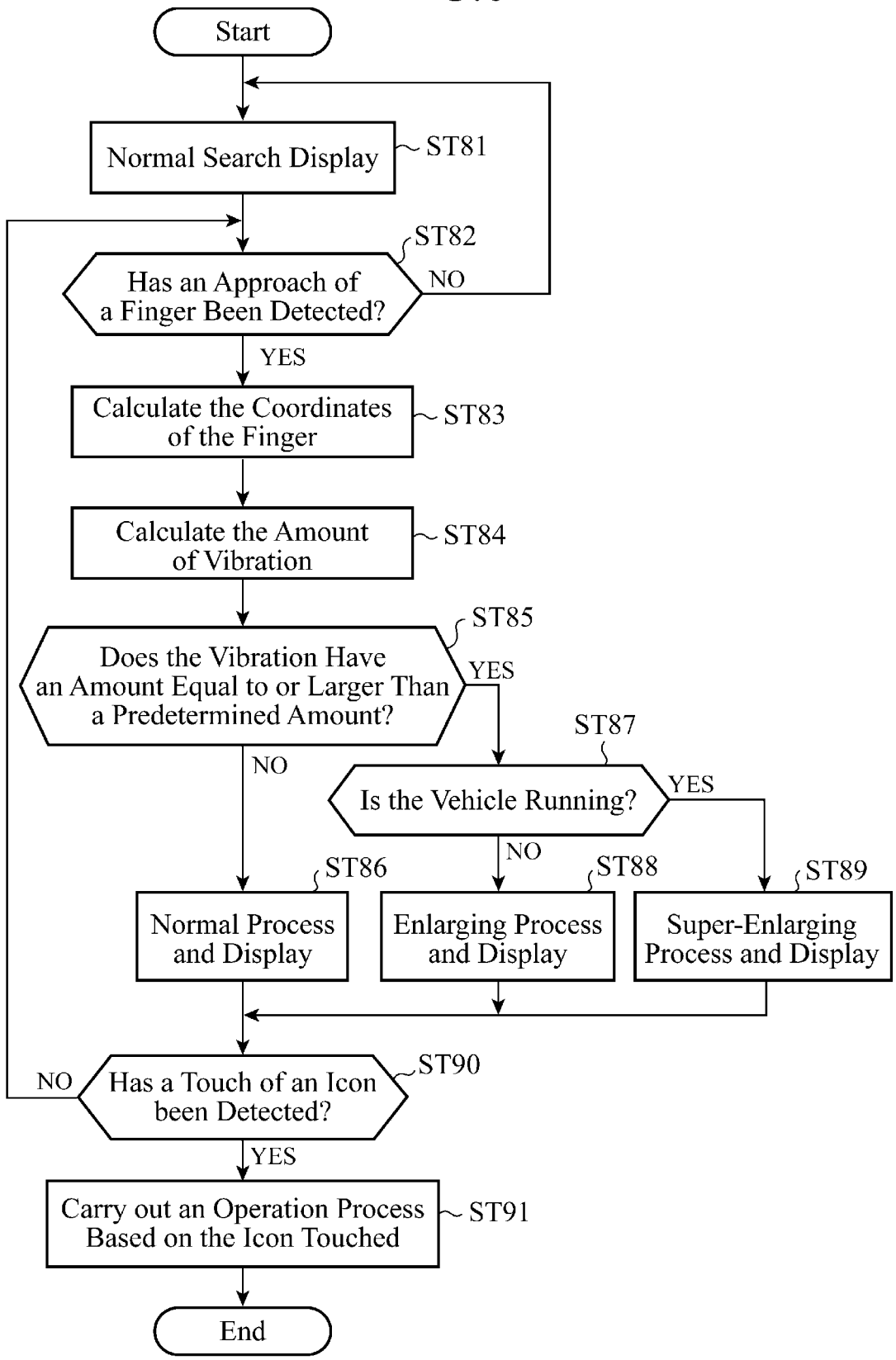
FIG. 8 is a flow chart showing the operation of a display input device in accordance with Embodiment 2 of the present invention.

FIG. 8 is a flowchart showing the operation of a display input device in accordance with Embodiment 2 of the present invention. In Embodiment 2 which will be explained hereafter, an example in which the display input device explained in Embodiment 1 is applied to a vehicle so as to enlarge an image in a display area having a fixed range to a further larger size to display the further-enlarged image while the vehicle is running, thereby, even if the vehicle is running, making it easy for a user to perform an input operation, and providing a further improvement in the ease of use of the display input device will be shown.

Also in Embodiment 2 which will be explained hereafter, the display input device can employ the same structure as that shown in FIGS. 1 to 3, like that in accordance with above-mentioned Embodiment 1.

In the flow chart of FIG. 8, a soft keyboard used at the time of a facility search as shown in FIG. 9(*a*) is displayed on a touch panel 1, for example (step ST81). Then, when a user brings his or her finger close to the touch panel 1, proximity sensors 12 detects the approach of the finger (step ST82), an approaching coordinate position calculating unit 301 of a navigation CPU 30 calculates the X (Y) coordinate of the finger (step ST83), and a vibration determining unit 304 recognizes a vibration of the finger and calculates the amount of vibration (step ST84) to determine whether the amount of the vibration is equal to or larger than a predetermined amount (step ST85). These processes are the same as those in steps ST42 to ST45 of Embodiment 1 shown in the flow chart of FIG. 4 respectively.

In the display input device in accordance with Embodiment 2, which will be explained hereafter, when in the vibration determining process of determining whether the vibration has a predetermined amount or more of step ST85, the vibration determining unit 304 determines that there is no vibration (finger vibration) whose amount is equal to or larger than the predetermined amount (if "NO" in step ST85), the vibration determining unit 304 controls an image information creating unit 305 under the control of a main control unit 300, and the image information creating unit 305 carries out a image creating process for normal display (step ST86), whereas when determining that the vibration has an amount equal to or larger than the predetermined amount ("YES" in step ST85), the vibration determining unit 304 further determines whether or not the vehicle is running according to information from external sensors 2 (a speed sensor 22) acquired by a vehicle information acquiring unit 303 (step ST87).

When the vibration of the finger has an amount equal to or larger than the predetermined amount (if "YES" in step ST85), and the vehicle is stopped (if "NO" in step ST87), the vibration determining unit 304 controls the image information creating unit 305 via the main control unit 300 and the image information creating unit 305 carries out an update of the image for the enlarging process. In contrast, when the vibration of the finger has an amount equal to or larger than the predetermined amount (if "YES" in step ST85), and the vehicle is running (if "YES" in step ST87), the vibration determining unit 304 controls the image information creating unit 305 via the main control unit 300 and the image information creating unit 305 carries out a process of enlarging the image to a further larger size (super-enlargement) and then carries out an update of the image (step ST89).

More specifically, in order to carry out the process of enlarging the image in the display area having the fixed range which is displayed on the touch panel 1, the image information creating unit 305 reads the image information in a partial area (in a circle in the figure) of the already-created soft keyboard from an image information storage area 322 of a memory 32 while skipping at fixed intervals of some pixels, and interpolates intermediate pixels to combine this image with image information about a surrounding image which is not enlarged into new image information, and update the soft keyboard image using the new image information, as shown in FIG. 9(*b*), for example.

Also, in order to carry out the process of super-enlarging the image in the display area having the fixed range which is displayed on the touch panel 1, the image information creating unit 305 reads the image information in a partial area (in a circle in the figure) of the already-created soft keyboard from the image information storage area 322 of the memory 32 while skipping at fixed intervals of a larger number of pixels, and interpolates intermediate pixels to combine this image with image information about a surrounding image which is not enlarged into new image information, and update the soft keyboard image using the new image information, as shown in FIG. 9(*c*), for example.

The updated image information is outputted to an image information transferring unit 306 while the updated image information is stored in the image information storage area 322 of the memory 32.

The image information transferring unit 306 receives the updated image information and then transfers this image information to a drawing circuit 31, and a drawing control unit 310 of the drawing circuit 31 expands the image information transferred thereto, and a drawing unit 312 draws the expanded image information into a bitmap memory unit 313 at a high speed. Finally, a display control unit 314 reads the image drawn into the bitmap memory unit 313, and creates an enlarged screen display or a super-enlarged screen display on the touch panel 1 (an LCD panel 10) (steps ST88 and ST89).

After the image information creating unit 305 has carried out the above-mentioned normal process and display (step ST86), the above-mentioned enlarging process and display (step ST88), or the above-mentioned super-enlarging process and display (step ST89), when the touch panel 1 (a touch sensor 11) detects that the finger has touched an icon (if "YES" in step ST90), a touch coordinate position calculating unit 302 calculates the coordinate position of the touch and then starts an operation information processing unit 307.

At this time, the operation information processing unit 307 carries out an operation process based on the key corresponding to the coordinates of the touch calculated by the touch coordinate position calculating unit 302 (step ST91), and ends the above-mentioned series of display input processes on the touch panel 1.

In the above-mentioned display input device in accordance with Embodiment 2 of the present invention, when the external sensors 2 (the speed sensor 22) detect that the vehicle is running, the control unit 3 (the navigation CPU 30) enlarges an image in a display area having a fixed range, which is displayed on the touch panel 1, to a further larger size compared with that of an enlarged image which is created thereby when a vibration having a predetermined amount or more is detected by the vibration sensor, such as the proximity sensors 12 or the acceleration sensor 23, to display the enlarged image. Therefore, the display input device makes it easy for a user to perform an input operation on the touch panel 1 irrespective of the running state of the vehicle, and can provide a new user interface which is not influenced by vibrations of the vehicle and vibrations of a finger while the vehicle is running. Thus, the user-friendliness of the display input device can be improved and the ease of use of the display input device can be further improved.

In the above-mentioned display input device in accordance with Embodiment 2, the control unit 3 (the navigation CPU 30) carries out the enlarging display process when the approaching finger has an amount equal to or larger than the predetermined amount and the vehicle is stopped, while the control unit 3 carries out the super-enlarging display process when the vehicle is running. When carrying out the enlarging process, the control unit 3 can change the scale of enlargement according to the vibration amount.

As a result, the display input device can create an appropriate screen display of the image in the display area having the fixed range, such as a software keyboard or an icon, according to the amount of vibration of the vehicle (the touch panel 1) or the finger, and therefore the ease of use of the display input device at the time when the user performs a touch input is further improved. In this case, the image information creating unit 305 needs to read the already-created image in the display area having the fixed range from the image information storage area 322 of the memory 32 while skipping at fixed intervals of some pixels dependent upon the vibration amount, and interpolates intermediate pixels to create an enlarged image or a super-enlarged image.

Furthermore, when a vibration of a finger is detected in a state where the finger is in contact with the touch panel 1, not in a state where the finger is approaching the touch panel 1, the control unit 3 (the navigation CPU 30) can carry out the process of enlarging the image in the display area having the fixed range which is displayed on the touch panel 1 to display the enlarged image, and, when a vibration is detected while the vehicle is running, can carry out the process of enlarging the image to a further larger size to display the enlarged image.

In this case, it is necessary to further mount a pressure sensor for detecting a pushdown pressure in the Z direction in the touch panel 1. Because the principle behind the detection of a pushdown pressure in the Z direction is disclosed by above-mentioned patent reference 3, the explanation of the principle will be omitted hereafter to avoid any duplicate explanation. Although the display input device determines whether the vibration of the finger has an amount equal to or larger than the predetermined amount in step ST85, the display input device can alternatively determine whether or not the vehicle is running first, perform the normal process and display while the vehicle is stopped because there are no external factors, such as a shake of the vehicle body, and branch to either the enlarging display process or the super-enlarging display process according to whether the vibration of the finger has an amount equal to or larger than the predetermined amount while the vehicle is running. This variant can provide the same advantages.

In above-mentioned Embodiment 2, although the speed sensor 22 detects whether the vehicle is running or stopped, whether the vehicle is running or stopped can be detected by any running detection unit, such as the speed sensor, the acceleration sensor, a device for detecting the state of a handbrake, or an image processing device.

Embodiment 3

Figure 10:
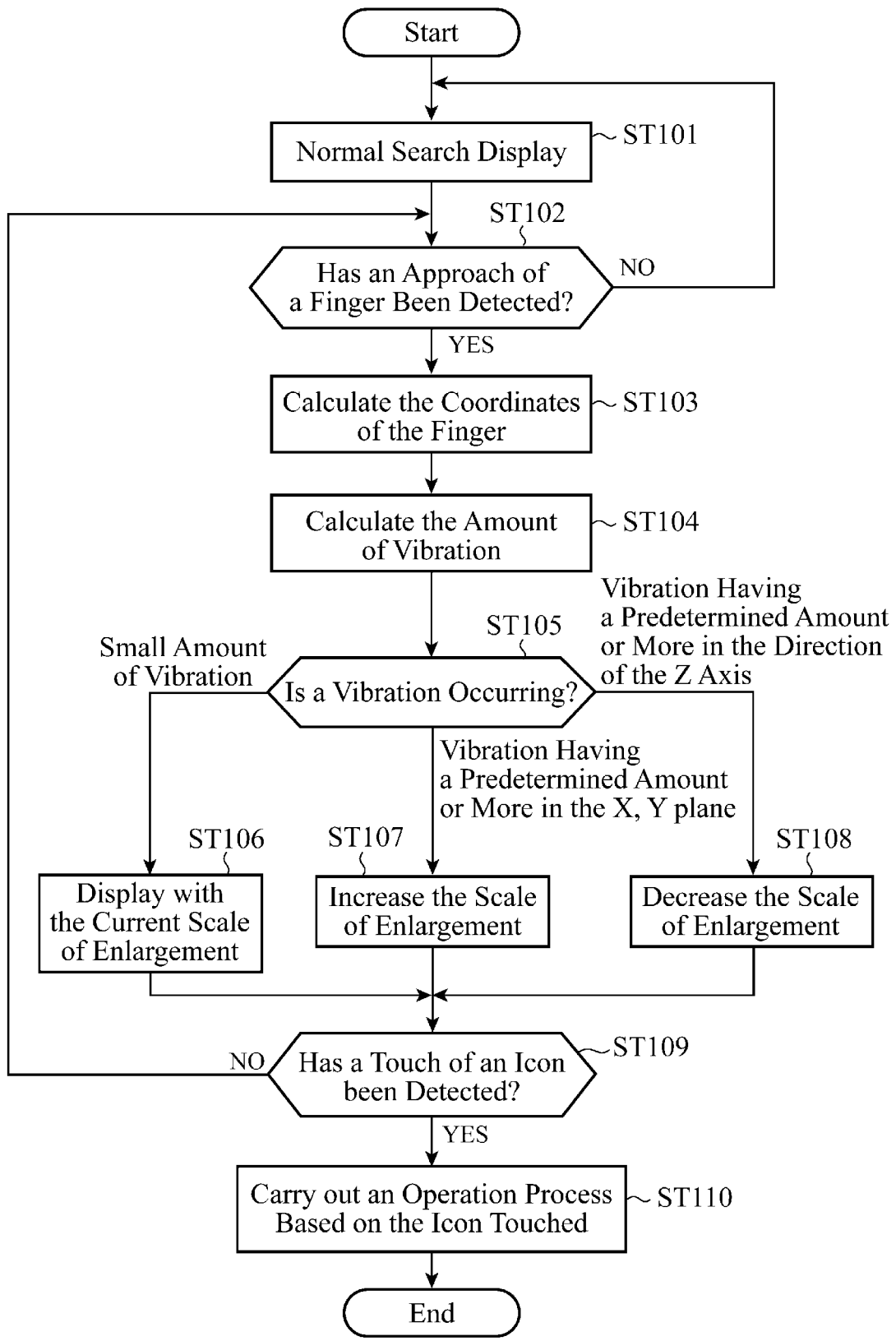
FIG. 10 is a flow chart showing the operation of the display input device in accordance with Embodiment 3 of the present invention.

FIG. 10 is a flow chart showing the operation of a display input device in accordance with Embodiment 3 of the present invention. The display input device in accordance with Embodiment 3 which will be explained hereafter is applied to a three-dimensional touch panel which can also measure the distance in the Z direction between its panel surface and a finger. More specifically, the touch panel 1 shown in FIG. 1 that can detect the position of an object in the X and Y directions is replaced by the three-dimensional touch panel that can also measure a distance in the Z direction. Because a technology of measuring a three-dimensional position is disclosed by above-mentioned patent reference 2, an explanation will be made assuming that this technology is simply applied to this embodiment.

The display input device in accordance with Embodiment 3, which will be explained hereafter, provides a new user interface via which the scaling of an image in a display area having a fixed range can be controlled according to a user's intention by carrying out an enlarging display process when an approaching finger has a horizontal vibration, or by carrying out a reducing display process when an approaching finger has a vertical vibration.

Also in Embodiment 3 which will be explained hereafter, the display input device can employ the same structure as that shown in FIGS. 1 to 3, like those in accordance with above-mentioned Embodiments 1 and 2, with the exception that the display input device includes an approaching coordinate position calculating unit 301 which is upgraded in such a way as to be able to calculate a Z coordinate in addition to X and Y coordinates because the touch panel 1 which can detect the two-dimensional coordinate position of a finger is replaced by the touch panel which can detect the three-dimensional coordinate position of a finger.

In the flow chart of FIG. 10, a soft keyboard used at the time of a facility search is displayed on the touch panel 1, for example (step ST101), like in the case of Embodiment 1 (FIG. 5(*a*)) and Embodiment 2 (FIG. 8(*a*)).

Then, when a user brings his or her finger close to the touch panel 1, proximity sensors 12 detects the approach of the finger, an approaching coordinate position calculating unit 301 of a navigation CPU 30 calculates the X (Y) coordinate of the finger, and a vibration determining unit 304 recognizes a vibration of the finger and calculates the amount of vibration to determine whether the amount of vibration is equal to or larger than a predetermined amount (steps ST102 to ST105). These processes are the same as those in steps ST42 to ST45 of Embodiment 1 shown in the flow chart of FIG. 4 and are also the same as those in steps ST82 to ST85 of Embodiment 2 shown in the flow chart of FIG. 8 respectively.

In the display input device in accordance with Embodiment 3, which will be explained hereafter, when in the vibration determining process of determining whether the vibration has a predetermined amount or more of step ST105, the vibration determining unit 304 determines that each of the vibration (finger vibration) in the X, Y plane and the vibration (finger vibration) in the direction of the Z axis does not reach a predetermined amount ("small amount of vibrations" in step ST105), the vibration determining unit 304 controls an image information creating unit 305 under the control of a main control unit 300, and the image information creating unit 305 carries out an image creating process in such a way as to maintain the scale of enlargement of the image currently being displayed (step ST106).

In contrast, when determining that the vibration in the X, Y plane has an amount equal to or larger than the predetermined amount ("vibrations in the X, Y plane" in step ST105), the vibration determining unit 304 controls the image information creating unit 305 under the control of the main control unit 300 and the image information creating unit 305 carries out an image creating process in such a way as to create a screen display with a scale of enlargement higher than the current scale of enlargement (step ST107). Furthermore, when determining that the vibration in the direction of the Z axis has an amount equal to or larger than the predetermined amount ("a vibration in the Z axis" in step ST105), the vibration determining unit 304 controls the image information creating unit 305 under the control of the main control unit 300 and the image information creating unit 305 carries out an image creating process in such a way as to create a screen display with a scale of enlargement lower than the current scale of enlargement (step ST108).

More specifically, in order to carry out the process of enlarging the image in the display area having the fixed range which is displayed on the touch panel 1 (steps ST106 to ST108), the image information creating unit 305 reads the already-created image, such as a software keyboard, in the display area having the fixed range from an image information storage area 322 of a memory 32 while skipping at fixed intervals of some pixels dependent upon the scale of enlargement, and interpolates intermediate pixels to combine this image with image information about a surrounding image into new image information, and update the soft keyboard image using the new image information, for example.

The updated image information is outputted to an image information transferring unit 306 while the updated image information is stored in the image information storage area 322 of the memory 32. The image information transferring unit 306 receives the updated image information and then transfers this image information to a drawing circuit 31, and a drawing control unit 310 of the drawing circuit 31 expands the image information transferred thereto, and a drawing unit 312 draws the expanded image information into a bitmap memory unit 313 at a high speed. Finally, a display control unit 314 reads the image drawn into the bitmap memory unit 313, and creates an enlarged screen display or a reduced screen display on the touch panel 1 (an LCD panel 10).

After the navigation CPU 30 (the image information creating unit 305) has performed the above-mentioned enlarging process based on the scale of enlargement determined by the vibration amount, and after the drawing circuit 31 has performed the display process (steps ST106 to ST108), when the touch panel 1 (a touch sensor 11) detects that the finger has touched an icon (if "YES" in step ST109), a touch coordinate position calculating unit 302 of the navigation CPU 30 calculates the coordinate position of the touch and then starts an operation information processing unit 307.

At this time, the operation information processing unit 307 carries out an operation process based on the key corresponding to the coordinates of the touch calculated by the touch coordinate position calculating unit 302 (step ST110), and ends the above-mentioned series of display input processes on the touch panel 1.

In the above-mentioned display input device in accordance with Embodiment 3 of the present invention, when a horizontal vibration having a predetermined amount or more of a finger which is positioned opposite to the touch panel 1 is detected, the control unit 3 (the navigation CPU 30) carries out the enlarging process of enlarging a content in a display area having a fixed range which is displayed on the touch panel 1 according to the scale of enlargement dependent upon the vibration amount to display the enlarged content, and when a vertical vibration having a predetermined amount or more of a finger which is positioned opposite to the touch panel 1 is detected, the control unit 3 carries out a reducing process of reducing the content to display the reduced content. The display input device can thus provide a new user interface via which the scaling of an image in a display area having a fixed range can be controlled according to a user's intention (e.g. a user's wave of his or her finger in a three-dimensional direction). As a result, while the display input device makes it easy for a user to perform an input operation on the touch panel, the user-friendliness of the display input device can be improved and the ease of use of the display input device can be further improved. Although the scale of enlargement is increased in step ST107 of FIG. 10, a limit can be imposed on the scale of enlargement in step ST107 in such a way that the scale of enlargement does not exceed a maximum of the scale of enlargement, e.g. an upper limit which is set to be twice the original scale of enlargement. Although the scale of enlargement is decreased in step ST108, a lower limit can be imposed on the scale of enlargement in such a way that the scale of enlargement does become equal to or smaller than 1.0. The display input device can be constructed in such a way as to, when the vibration in the X, Y plane has much the same amount as that in the direction of the Z axis, determine that the user's intention is not clarified, and therefore does not change the scale of enlargement. When both a vibration in the X, Y plane and a vibration in the direction of the Z axis are occurring, the display input device can give a priority to the larger one of them to perform the scaling process. As an alternative, the display input device can multiply the amount of vibration in the direction of the Z axis by a fixed number, e.g. 2, while keeping the amount of vibration in the X, Y plane, and then give a priority to the larger one of them to perform the scaling process. As an alternative, the display input device can be constructed in such a way as to carry out the enlarging process when only a vibration in the direction of the X axis is occurring, or carry out the reducing process when only a vibration in the direction of the Y axis is occurring. This variant offers the same advantages. As an alternative, the display input device can be constructed in such a way as to, when a slanting vibration including a vibration in the direction of the Z axis is occurring, take into consideration only the larger one of the slanting vibration and the vibration in the X, Y plane, or, when the amount of slanting vibration is much the same as that of vibration in the X, Y plane, does not carry out any enlarging or reducing process. Because the direction of vibration is ambiguous in this case, a message can be made to appear saying that any enlarging or reducing process is not carried out.

As previously explained, the display input device in accordance with any one of above-mentioned Embodiments 1 to 3 of the present invention creates an enlarged screen display of an image in a display area having a fixed range, such as a software keyboard or an icon, which is displayed on the screen when it is detected that a finger or the vehicle (the touch panel 1) has a vibration having a predetermined amount or more. Therefore, because the display input device can facilitate a user's input operation and provide excellent ease of use even when a vibration is occurring in a finger or the vehicle.

In the above-mentioned display input device in accordance with any one of Embodiments 1 to 3, although only keys of the software keyboard are explained as an example of the image in the display area having the fixed range, a specific image, such as an icon which is a target for an input operation which is performed in order to carry out navigation, can be the image in the display area having the fixed range. Furthermore, although only a finger is explained as an example of the object to be detected for the detection of a vibration, the object to be detected can be a pen or the like. Even in this case, the same advantages are provided. In addition, although the acceleration sensor 23 mounted in the vehicle is explained as the sensor used for the detection of a vibration of the touch panel 1, an acceleration sensor can be mounted in the touch panel 1 or the control unit 3, and, in this variant, a higher-precision vibration detection can be implemented because a vibration of the vehicle can be measured by the external sensors 2 (the acceleration sensor 23) and a vibration of the touch panel 1 can be measured by the acceleration sensor mounted in the touch panel 1 or the control unit 3.

The functions which the control unit 3 (the navigation CPU 30) shown in FIG. 2 has can be all implemented via hardware, or at least a part of the functions can be implemented via software.

For example, the data process of carrying out the process of enlarging an image in a display area having a fixed range which is displayed on the touch panel 1 to display the enlarged image when it is determined that the relative vibration between the touch panel 1 and a finger which is detected by the vibration sensor has an amount equal to or larger than a predetermined amount, which is carried out by the control unit 3, can be implemented via one or more programs on a computer, or at least a part of the data process can be implemented via hardware.

INDUSTRIAL APPLICABILITY

Because the display input device in accordance with the present invention enables a user to easily perform an input operation even when a vibration is occurring and can provide excellent ease of use, the display input device in accordance with the present invention is suitable for use in vehicle-mounted information equipment of a navigation system, and so on.

The invention claimed is:

1. A vehicular display input device comprising: a touch panel configured to detect an approach of an object to be detected in a non-contact manner, and carry out an input of information and a display of an image; a vibration detection sensor configured to detect a relative vibration between the touch panel and said object to be detected which is facing said touch panel; a running detecting unit configured to detect a state as to running of a vehicle which is equipped with the display input device; and a control unit configured to calculate a vibration amount based on the relative vibration detected by the vibration detection sensor, compare the calculated vibration amount with a predetermined amount, and carry out, when the vibration amount is equal to or more than the predetermined amount, a process of enlarging a fixed range of an image which is being displayed on said touch panel, wherein the control unit is further configured to determine which one of a running state and a stopped state is indicated by the state detected by the running detecting unit, and control the enlargement process to increase an enlargement scale in the running state more than that in the stopped state.

2. A vehicular display input device comprising: a touch panel configured to detect an approach of an object to be detected in a non-contact manner, and carry out an input of information and a display of an image; a vibration detection sensor configured to detect a relative vibration between the touch panel and said object to be detected which is facing said touch panel; and a control unit configured to calculate a vibration amount based on the relative vibration detected by the vibration detection sensor, compare the calculated vibration amount with a predetermined amount, and carry out, when the vibration amount is equal to or more than the predetermined amount, a process of enlarging a fixed range of an image which is being displayed on said touch panel, wherein the vibration detection sensor is further configured to detect the relative vibration with respect to each of a horizontal direction and a vertical direction to the touch panel, and wherein the control unit is further configured to carry out the enlargement process when the vibration amount with respect to the horizontal direction is equal to or more than the predetermined amount, and carry out a process of reducing a size of the fixed range of the image which is being displayed on the touch panel when the vibration amount with respect to the vertical direction is equal to or more than the predetermined amount.

3. The display input device according to claim 1, wherein said control unit changes a scale of enlargement to be applied to the enlargement process in accordance with the relative vibration detected by said vibration detection sensor.

4. The display input device according to claim 1, wherein said vibration detection sensor includes a proximity sensor for detecting a relative position of the object to be detected with respect to said touch panel in a non-contact manner, and the control unit calculates the relative vibration amount by using the relative position detected by the proximity sensor.

5. The display input device according to claim 1, wherein said vibration detection sensor includes an acceleration sensor for detecting acceleration information on a vehicle which is equipped with the display input device, and the control unit calculates the relative vibration amount by using the acceleration information detected by the vibration detection sensor.

6. The display input device according to claim 1, wherein said vibration detection sensor includes a proximity sensor for detecting a relative position of the object to be detected with respect to said touch panel in a non-contact manner, and an acceleration sensor for detecting acceleration information on a vehicle which is equipped with the display input device, and said control unit calculates the relative vibration amount by using the relative position detected by said proximity sensor and the acceleration information detected by said acceleration sensor.

7. The display input device according to claim 1, wherein said control unit stores data about values indicating the relative vibration detected by said vibration detection sensor in a time series during a predetermined time period, extracts data corresponding to predetermined vibration frequencies from the stored data, and compares an average value acquired from the extracted data as the vibration amount with the predetermined amount.

8. A navigation device comprising: a touch panel configured to detect an approach of an object to be detected in a non-contact manner, and carry out an input of information and a display of an image; a vibration detection sensor configured to detect a relative vibration between the touch panel and said object to be detected which is facing said touch panel; a running detecting unit configured to detect a state as to running of a vehicle which is equipped with the display input device; and a control unit configured to perform a navigation process in accordance with an input operation on the touch panel, calculate a vibration amount based on the relative vibration detected by the vibration detection sensor, compare the calculated vibration amount with a predetermined amount, and carry out, when the vibration amount is equal to or more than the predetermined amount, a process of enlarging a fixed range of an image which is being displayed on said touch panel, wherein the control unit is further configured to determine which one of a running state and a stopped state is indicated by the state detected by the running detecting unit, and control the enlargement process to increase an enlargement scale in the running state more than that in the stopped state.

* * * * *